United States Patent [19]
Lagerberg

[11] Patent Number: 6,053,669
[45] Date of Patent: Apr. 25, 2000

[54] CHIP FORMING CUTTING INSERT WITH INTERNAL COOLING

[75] Inventor: Stig Lagerberg, Sandviken, Sweden

[73] Assignee: Sandvik Aktiebolag, Sandviken, Sweden

[21] Appl. No.: 08/972,320

[22] Filed: Nov. 18, 1997

[30] Foreign Application Priority Data

Nov. 18, 1996 [SE] Sweden .................................. 9604203

[51] Int. Cl.⁷ .................................................. B23B 27/22
[52] U.S. Cl. ................................ 407/11; 407/5; 407/119; 407/120
[58] Field of Search ................................ 407/11, 5, 6, 2, 407/3, 4, 118, 119, 120; 82/901; 408/56, 57, 59

[56] References Cited

U.S. PATENT DOCUMENTS

| | | |
|---|---|---|
| 3,571,877 | 3/1971 | Zerkle . |
| 3,698,725 | 10/1972 | Klabunde .................................. 277/74 |
| 4,399,878 | 8/1983 | Karlsson et al. ........................ 175/227 |
| 5,237,894 | 8/1993 | Lindeke . |
| 5,275,633 | 1/1994 | Johansson et al. . |
| 5,439,327 | 8/1995 | Wertheim . |
| 5,460,761 | 10/1995 | Larsson . |
| 5,779,401 | 7/1998 | Stallwitz et al. ...................... 407/11 X |

FOREIGN PATENT DOCUMENTS

| | | |
|---|---|---|
| 2 244 590 | 4/1975 | France . |
| 404129622 | 4/1992 | Japan ...................................... 407/11 |
| 429 934 | 2/1979 | Sweden . |
| 454 247 | 4/1985 | Sweden . |

*Primary Examiner*—Henry W. H. Tsai
*Attorney, Agent, or Firm*—Burns, Doane, Swecker & Mathis, L.L.P.

[57] ABSTRACT

A cutting insert is cooled during chip removing machining of a workpiece by conducting cooling medium through a porous supporting body of the insert. The cooling medium enters the insert through an inlet formed therein at a location remote from a cutting edge of the insert and exits the insert through an outlet formed in the insert at a location proximate the cutting edge. The discharged cooling medium impinges on, and cools, the workpiece.

8 Claims, 2 Drawing Sheets

CHIP FORMING CUTTING INSERT WITH INTERNAL COOLING

TECHNICAL FIELD OF THE INVENTION

This invention refers to a cutting insert with internal cooling and intended for chip removing machining, the insert having an upper side, an underside and one or more side faces which extend therebetween and which includes at least one cutting edge in the area of the upper side and in addition a clearance surface connected to the cutting edge which at least partially forms a side surface and on the other hand means by which a cooling medium can be guided in a direction towards the cutting edge in order to cool that edge.

BACKGROUND OF THE INVENTION

Prior Art

Cutting inserts for chip removing machining become heated under the machining operations which causes the heat to quickly spread through the cutting insert. The cutting insert, which generally consists of cemented carbide, therefore reaches, in a very short time, a range of temperatures within which the resistance to plastic deformation of the cutting insert material decreases. When large cutting forces act on the cutting insert this phenomenon entails a risk that the cutting insert will be subject to plastic deformation in particular in the proximity of the cutting edge, whereby insert breakage can result. In order to diminish the risk of plastic deformation an efficient system for the cooling of the cutting insert is required such that the working temperature of the insert can be regulated within desired limits. Generally, the cutting insert and the surrounding so-called cutting zone, are cooled by a cooling medium in fluid form which is led from outside to flow towards the area where the heat is generated. Previously, such a supply of cooling medium has been generally arranged from above and been directed downwardly towards the cutting insert and the chips which are broken against the chip breaking upper side of the cutting insert. This method of supply, however, results in only a very limited amount of the cooling medium having any practical effect on the cutting insert. That is, because of the presence of the chips, the cutting edge is only exposed to the cooling medium to a very limited degree.

Another means of supplying cooling medium in fluid form is to steer the medium in a direction between the chip breaking surface of the cutting insert and the chip itself. However, when the cooling liquid is applied at normal pressures this procedure does not result in any significant improvement in cooling effect compared to the aforementioned methods because the cooling liquid does not reach that part of the cutting insert which is hottest and which is exposed to the greatest mechanical load. Thus, a clear risk exists of the cutting insert becoming plastic because of excessively high temperature. The effect of the cooling can certainly be increased considerably by increasing the pressure of the cooling liquid to very high levels, e.g., 250–300 Mpa, but the equipment required to raise the cooling liquid pressure to this level is very complicated and expensive. Working with extremely high fluid pressure is furthermore, in practice, associated with appreciable safety risks.

In order to overcome the problem indicated above it has been proposed more recently that the cutting insert itself be cooled from within, with the prime aim of holding the temperature in the cutting insert at such a low level that the risk of plastic deformation is to all intents and purposes eliminated. Several different solutions as to the problem of how to provide internal cooling of cutting inserts are to be found in the patent literature for this area. Thus Swedish Patent 467 649 describes a cutting insert which is composed of two identical, partial bodies which are sintered together in such a way as to form internal, open channels through which the cooling medium can flow. Swedish Patent No. 429 934 describes a cutting insert with a transverse hole through which cooling medium can pass from an underlying shim in the direction towards a separate cover plate on the upper side of the cutting insert in order to be finally directed towards the cutting edge of the insert. French Patent 2,244,590 describes a cutting insert with a transverse channel for the cooling medium which extends from the underside of the cutting insert to the upper side where it discharges in the immediate vicinity of the cutting insert's cutting edge. European Publication 0 534 450 describes a cutting insert for parting, the insert having an open groove disposed in the clearance surface of the cutting insert for the transport of cooling medium from a channel in the corresponding tool holder in the direction of the cutting insert edge. U.S. Pat. No. 5,237,894 describes a cutting insert with a transverse, open channel for cooling liquid which terminates in an opening on the upper side of the cutting insert.

Common to all the solutions to the problem indicated above, which are based on transverse or open channels or grooves for feeding the cooling medium, is that the channels weaken the cutting insert in the cutting edge area and there is a risk that the channels will be blocked by the hot material of the chip which sticks to the insert surface. Furthermore, the existence of the channels or grooves limits the possibilities to design the cutting insert with an optimal chip breaker geometry.

It should also be mentioned that Swedish Document No. 377 290 describes a cutting insert with an internal cavity in which cooling medium can circulate. However, this cavity weakens the cutting insert to such a large degree that its use is not practical when exposed to typical cutting forces.

SUMMARY AND OBJECTS OF THE INVENTION

The aim of the present invention is to eliminate the drawbacks of inserts with an internal coolant supply for chip removing machining as mentioned above and create an improved cutting insert. One basic purpose with the invention is thus to create a cutting insert which can be cooled efficiently without the assistance of open channels or grooves which run the risk of being clogged by chips. Another aim is to create a cutting insert which can be cooled efficiently by an internal supply of cooling medium without the mechanical strength of the cutting insert being significantly reduced and without the external geometry of the cutting insert, e.g., the chip breaking geometry, being limited because of the means necessary for the supply of cooling medium. A further purpose is to create a cutting insert which allows an efficient steering of the flow of cooling medium to the immediate vicinity of the edge without weakening or deteriorating the surface which is exposed to direct mechanical load from the chips in comparison to conventional, externally cooled cutting inserts. A further purpose is to create a cutting insert which, despite efficient cooling of the cutting edge of the cutting insert, does not require anything more than limited amounts of cooling medium.

The present invention relates to a cutting insert having a cutting edge for chip removing machining. The cutting insert includes a supporting body formed of a porous material adapted to conduct a flow of cooling medium. The sporting body is at least partially enveloped by a shell substantially impermeable to cooling medium. The shell has at least two openings exposing the supporting body. A first of the openings is disposed remotely from the cutting edge and serves as an entrance for cooling medium. A second of the openings is disposed proximate to the cutting edge and serves as an exit for cooling medium.

The shell preferably includes a wear body disposed on an upper surface of the supporting body and forming the cutting. The shell also comprises a surface layer which is thinner than the wear body.

BRIEF DESCRIPTION OF THE DRAWINGS

The objects and advantages of the invention will become apparent from the following detailed description of preferred embodiments thereof in connection with the accompanying drawings, in which like numerals designate like elements, and in which:

FIG. 1 a schematic, perspective, exploded view showing a completed, cutting insert according to the invention produced in an embodiment in which the cutting insert is mounted in a tool holder with the help of a screw;

FIG. 2 an enlarged section through the cutting insert only, according to FIG. 1;

FIG. 3 a section showing the cutting insert as assembled in the holder, wherein only a forward part of the cutting insert holder is shown and wherein the clamping screw is shown partly in view, partly in section;

DETAILED DESCRIPTION OF THE PREFERRED EMBODIMENTS OF THE INVENTION

Figures 1, 2, 3:
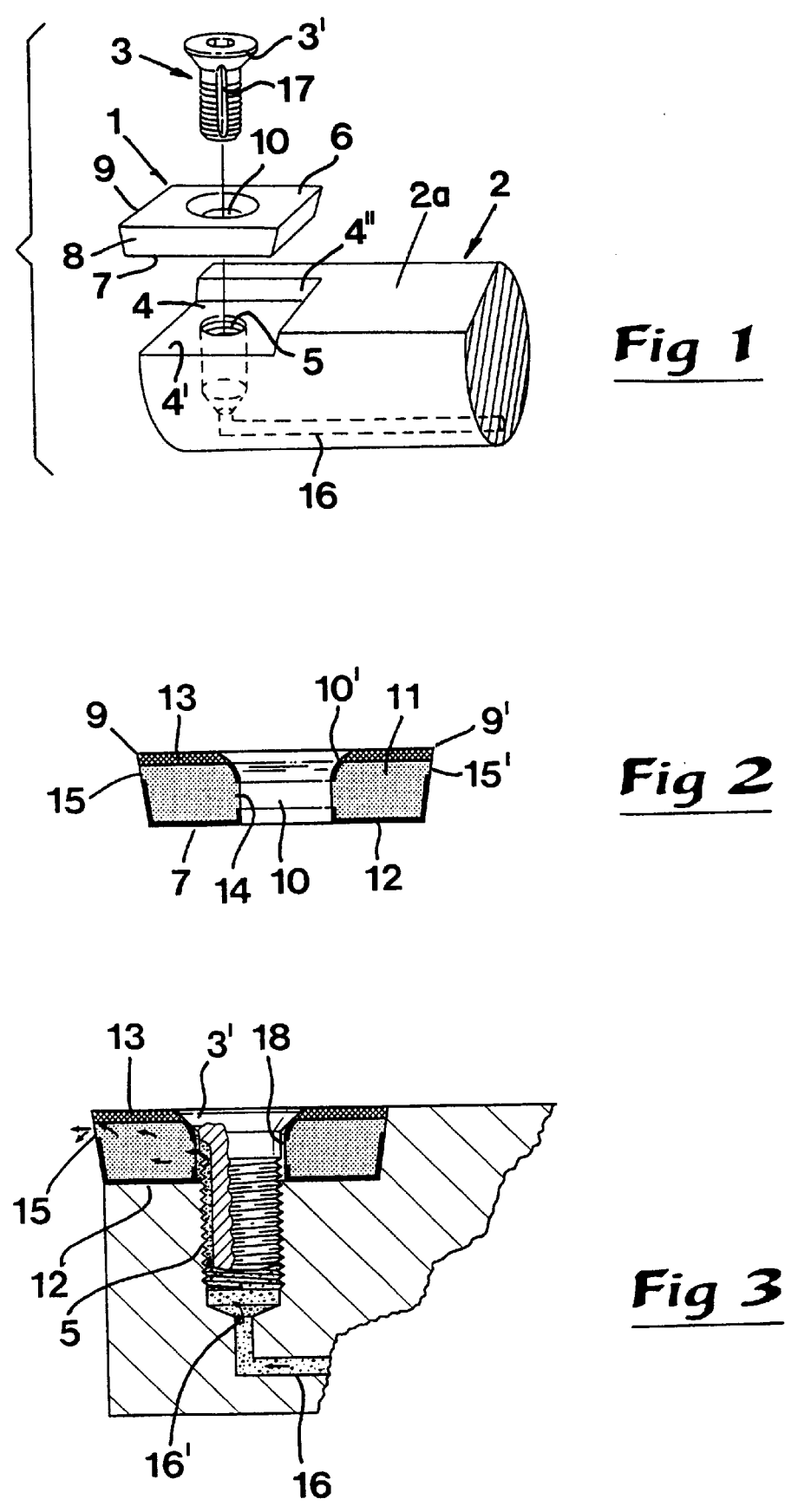
Figure 4:
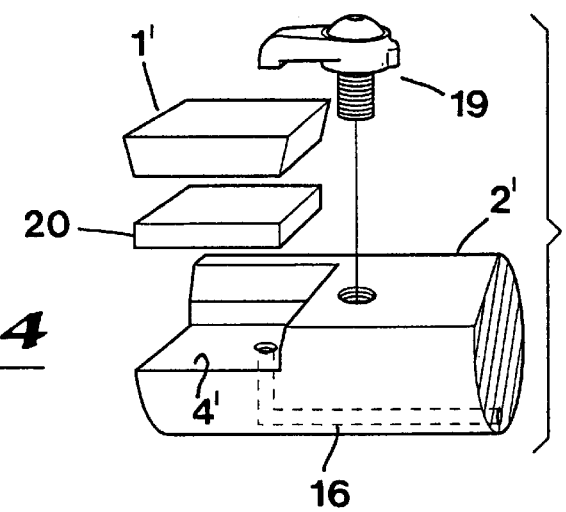
FIG. 4 a perspective, exploded view showing a cutting insert according to another embodiment of the invention which can be assembled with the help of a so-called clamp, whereby a shim is placed under the cutting insert.

In FIG. 1 a cutting insert 1 according to the invention is being assembled in a holder 2. In the example shown this is achieved with the help of a clamping screw 3. The cutting insert holder 2, of which only a forward part is illustrated in FIG. 1, has the form of a shank which has cylindrical basic form with the exception of a planar side surface 2a. At the forward end of the planar surface 2a an insert seat 4 is formed which is bordered by a bottom surface 4' and two side faces 4" positioned at an acute angle relative to a plane of the bottom surface 4'. The cutting insert 1 has a central, transverse hole 10 for the clamping screw 3, which is provided to be screwed down into a threaded hole 5 disposed in the bottom surface 4'.

Generally, the cutting insert 1 is limited by an upper surface 6, an under surface 7 (see FIG. 2) as well as four side faces 8 which extend between the upper surface and the under surface. In the embodiment taken as an example, the cutting insert has a positive geometry, wherein at least one edge 9 is formed between the upper side 6 and a side face 8, which is inclined to form a clearance surface.

Now refer to FIGS. 2 and 3 which clarify what is new and characteristic in the cutting insert 1 according to this invention. The cutting insert includes at least one supporting body 11 formed of a porous material having pores through which a cooling medium can flow. This supporting body 11 is at least partially surrounded by a thin surface layer 12 having an impermeable, non-porous material structure through which the cooling medium cannot pass or can only pass with very great difficulty. In the example shown, the cutting insert includes a single one-piece, porous supporting body 11, which occupies a largest part of the total volume of the cutting insert. A wear body 13 is also included on the cutting insert and it, like the surface layer 12, has a compact, non-porous material structure. The wear body 13 is, however, considerably thicker than the surface layer 12. Thus, in practice, the outer layer 12 can have a thickness of only a few or ten or so microns, while the wear body 13, which is connected to the upper side of the cutting insert, can have a thickness in the range of 0.5–1.5 mm, suitably about 1 mm (under the assumption that the cutting insert has a total thickness of a magnitude of 3–7 mm). FIG. 2 clearly shows that the aforementioned cutting edge 9 is formed on the wear body 13 which is relatively thick when compared to the surface layer 12. In the example shown the substantially planar wear body 13 extends along the entire upper side of the cutting insert in order to completely cover it. It is however also conceivable to develop a thick wear body only connected directly to the cutting edge 9, while remaining parts of the upper side of the cutting insert are covered by a thinner surface layer.

The actual supporting body 11 can, in principle, be produced by sintering the same kinds of powder materials which are used for the production of conventional cemented carbide inserts with a compact material structure, such as metal carbides, metal nitrides, ceramics or the like. More exactly, powder materials with comparatively large grain sizes are selected, e.g., in the range of 20–100 γm, and combined with a filler which is burnt off and/or gasified in connection with sintering. After the customary compacting process of a mixture of powder and filler (possibly together with a particular binder material) during the formation of an insert body with a nominal shape, the body is sintered at high temperature, e.g., of the magnitude of 1200° C. Whereby the individual powder grains are sintered together via atomic, point or sporadic bindings on the surfaces of the grains and at the same time the filler in the microscopic spaces between the powder grains is burnt up and gasified. In this manner the finished supporting body is formed with a micro-porous material structure through which at least gaseous cooling media can flow without the need to be subjected to other than moderate pressure.

In contrast to the manner in which the micro-porous supporting body 11 is produced, not only the thin surface layer 12, but also the thicker wear body 13 on the upper side of the cutting insert are provided with a powder mixture which gives an impermeable, non-porous material structure. In this manner the wear body 13, in particular, but also the surface layer 12, can have the same compact material structure as conventional cemented carbides or hard materials. In order to integrate the compact components of the cutting insert, i.e., combine the thick and mechanically much stronger wear body 13 as well as the thinner surface layer 12, with the micro-porous supporting body 11, two principal alternative methods of manufacturing are available. One conceivable approach is to introduce the powder mixtures which will form components 12, 13 into the same die as the powder mixture which will form the support body 11 and press them together prior to the final sintering. The second alternative is to press and sinter at least the porous supporting body 11 in a separate operation and subsequently sinter together the supporting body with the material or materials which will form the impermeable shell defined by the components 12, 13.

Another characteristic feature of the invention is that there are to be at least two openings in the impermeable shell to expose the porous structure of the support body. Thus, a first opening 14 is to be found in the outer layer 12 which serves as an entrance for the supply of a cooling medium to the inner of the supporting body. Another opening 15 serves as an outlet for the cooling medium from the inner of the supporting body. This opening for the outflow 15 is placed as near the cutting edge 9 as possible. In the case in question, the opening 15 is placed immediately under the forward part of the wear body 13 on which the cutting edge 9 is formed (in the example illustrated the cutting insert is thought of as being reversible and having at least one additional edge 9', whereby an opening 15' is also disposed in the proximity of this edge).

In the embodiment shown in FIGS. 2 and 3, in which the cutting insert is fixed in the cutting insert holder with the help of a screw and therefore has a central hole 10, the entrance 14 for the inflow for the cooling medium is formed as a circular groove in that part of the surface layer 12 which covers the rotationally symmetrical wall which delimits the hole. At the same time, the underside of the cutting insert is completely covered by the outer layer 12. The surface layer 12 extends along the side faces of the cutting insert up to the wear body 13, with the exception of the relatively small hole or holes 15 which form the outlet for the cooling medium. As is clearly shown in FIGS. 2 and 3, the opening for the outflow 15 has a height which is less than half the thickness of the cutting insert, wherein the opening is placed in direct connection to the underside of the wear body 13.

During the practical production of the cutting inserts according to this invention it should be necessary in the first stage to completely encase the micro-porous supporting body in an encapsulating, impermeable shell (consisting either of only a thin surface layer or, as shown in FIGS. 2 and 3, of a combination of a thin surface layer and a thicker wear body) and subsequently by some suitable means to open up the above mentioned entrances and exits for the inflow and outflow with the help of some appropriate machining operation. Examples of such machining are etching, blasting, grinding or spark erosion.

It is most advantageous to use as a cooling medium a gaseous medium, e.g., a cryogenic gas, such as nitrogen ($N_2$) which is subjected to a heightened, although moderate pressure (e.g, in the range of 20–25 bar).

The supply of the cooling medium to the cutting insert is accomplished as shown in FIGS. 1–3, with the help of the threaded hole 5 and the screw 3. More exactly, a recessed channel 16 is provided in the cutting insert holder 2, one end of which terminates in a rear, not shown, part of the cutting insert holder, the other end 16' terminating in the threaded hole 5. In FIG. 3 it is clearly shown how this end 16' of the channel terminates in the bottom of the threaded hole 5. From FIG. 1 it can be further seen that the clamping screw 3 features an axial external groove 17, which extends along the threaded part of the screw to the head of the screw.

This groove has a depth which is at least somewhat larger than the height of the threaded hole 5, which means that the lower part of the groove forms a free channel or passage even when the male thread part of the screw is screwed down tightly into the female thread of the hole 5. In other words the cooling medium from the channel 16 is fed through the channel groove 17 in the screw to the ring-shaped space 18 which exists between the outer surface of the screw and the inside of the hole 10 as a result of the fact that the hole 10 has a larger diameter than the threaded part of the screw. Upwards, this ring-shaped space 18 is delimited by the head of the screw 3', it can be advantageous if this head has a conical shape in order to effectively seal against an upper portion 10' of the hole which gets progressively wider in the upwards direction and which has a slightly arched form.

The cutting insert functions in the following manner. When the cutting insert is clamped in the seat 4 of the holder 2 by screwing down the screw 3 into the threaded hole 5, the cooling medium can be fed forwards into channel 16 in the cutting insert holder. Via the channel groove 17 and ring shaped space 18 the cooling medium flows forwards to the ring-shaped entrance 14 for the inflow in the impermeable outer layer of the cutting insert, wherein the cooling medium is pressed into the micro-porous inner of the supporting body 11. The cooling medium is forced onwards via pores in this structure towards the outflow holes 15, 15' in connection with the cutting edges 9, 9', due to the fact that the outer surface of the supporting body is covered by the shell which is formed jointly by the upper wear body 13 as well as the outer layer 12 on the underside and side faces of the body. Due to the fact that the opening 15' which works together with the temporarily inactive cutting edge 9' is reversed and placed against the side surface 4" which delimits the cutting insert pocket 4, the flow of cooling material through the opening for the outflow is impeded or stopped. In other words essentially all of the cooling medium will flow out from the cutting insert through the opening 15 which is to be found in the immediate proximity of the active working cutting edge 9.

Figure 5:
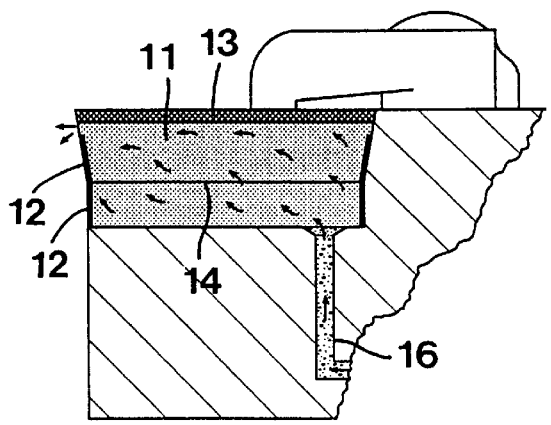
FIG. 5 an enlarged section through the forward part of the insert holder according to FIG. 4, whereby both the cutting insert and the shim are held locked in position with the aid of the clamp.

An alternative embodiment is shown in FIGS. 4 and 5 in which the cutting insert 1' is held fixed on the cutting insert holder 2' by a conventional clamp 19 instead of a transverse screw. In the example shown, a special shim 20 is provided between the cutting insert 1' and the bottom of the seat 4'. In this case, the bottom of the seat lacks any threaded hole, which is why a channel 16 for the cooling medium discharges directly into the bottom of the seat.

As is shown FIG. 5, the cutting insert 1' includes, in addition to a micro-porous supporting body 11 and an upper, relatively thick wear body 13, a surface layer 12 which only extends along the side faces of the cutting insert (with the exception of one or more the openings for the outflow where the outer layer is removed and the porous structure of the supporting body is uncovered). The surface layer on the underside of the cutting insert is however wholly or partly missing. This means that the porous structure of the supporting body is open and exposed in the downward direction, whereby the entire or part of the underside of the cutting insert forms an entrance 14 for the inflow of the cooling medium.

The shim 20 consists, in a similar manner to the cutting insert, of an insert body with a micro-porous material structure, whereof only the side faces of the shim are covered by a surface layer 12 of an impermeable, non-porous structure. In other words the porous structure of the body is exposed both upwards and downwards. The upper side of the shim thus forms an opening for the outflow of the cooling medium, while the underside forms an opening for the inflow. Via these entrances the inflow of the cooling medium from channel 16 can be lead into the shim and further up through supporting body 11 of the cutting insert in order to finally flow out through the outflow opening 15 in question.

Figure 6:
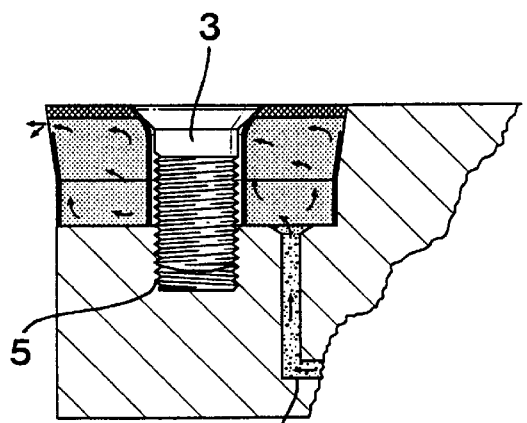
FIG. 6 a section showing still a further embodiment of the cutting insert and shim.
Figure 7:
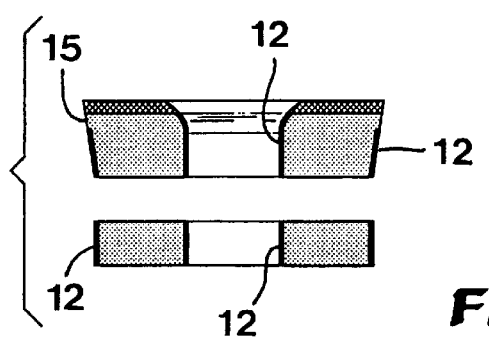
FIG. 7 a view of the cutting insert and shim according to FIG. 6 in an exploded view.

An additional alternative embodiment is illustrated in FIGS. 6 and 7 in which the cutting insert is clamped by a screw against a shim inserted between the cutting insert and the bottom of the seat. Analogous with the design shown in FIGS. 4 and 5, the underside of the cutting insert is open, in addition to which the upper and lower sides of the shim are open, and the side faces of the shim and the cutting insert are covered with a sealing surface layer 12 (the surface coating of the sides of the actual cutting insert include, of course, at least one opening 15 for the outflow). Center holes for the screw 3 are provided in both the cutting insert and the shim. Characteristic for the practical embodiment shown is that the rotationally symmetrical walls which delimit these holes are covered by surface layer 12 which impedes the cooling medium from being led into the ring-shaped space between the outside of the screw and the walls of the hole. In a similar way to the embodiment shown in FIGS. 4–5, the cooling medium is led into the underside of the shim via a channel 16. This channel is kept separate from the threaded hole 5 in the cutting insert holder which receives the screw 3.

One advantage of the cutting insert according to the invention is that it enables efficient cooling of just that part of the cutting insert which is dependent on being cooled, namely the cutting edge part. This advantageous effect is attained by forcibly guiding the cooling medium through an opening for the outflow situated in the immediate vicinity of the cutting edge. In the embodiments shown, the opening for the outflow is localized in the clearance surface of the cutting insert, hereby an additional advantage is achieved in that the cooling medium will also have an effect directly on the workpiece. The fact that the workpiece is also cooled in an efficient manner improves the dimensional accuracy of this, since plastic deformation of the actual workpiece is avoided. A further advantage is that cooling occurs completely without the assistance of open channels or grooves. This means that the cutting insert can be designed with optimal geometry without the hindrance of such channels. The existence of the particularly robust wear body in the upper surface of the insert which is composed of a compact material structure permits the insert to be exposed to considerable mechanical loads from the chips without damage occurring.

The production of sintered metallic bodies with a microporous inner material structure is in itself known previously through Swedish Patent 454 247 and European Publication 0 574 475. In these cases, however, the metallic bodies are utilized as dies for example, the casting of plastic components, whereby the role of the pores in the body of the die is to temporarily absorb those gases which are given off during pressing.

The invention is not limited only to the designs described and shown on the drawings. Instead of the square or quadrilateral shapes shown, the cutting insert can have other arbitrary basic forms, e.g., triangular or other forms of polygonal shape as well as circular or rotationally symmetrical shapes (in the latter case the cutting insert includes only a single continuous side surface). Instead of the positive cutting geometry shown the cutting insert can also have neutral or negative insert geometries. Further the specially, thick wear body on the upper side of the cutting insert can be dispensed with, whereby the micro-porous upper surface of the supporting body is only covered by a comparatively thin, protective surface layer with an impermeable material structure.

What is claimed is:

1. A cutting insert having a cutting edge for chip removing machining, the cutting insert including a supporting body comprising a porous material forming a microporous structure throughout the supporting body to conduct a flow of cooling medium, the supporting body having an outer periphery including an upper surface and a side face, the supporting body being enveloped by a shell substantially impermeable to cooling medium, the shell including a wear body disposed on the upper surface of the supporting body and forming the cutting edge, the shell having at least two openings exposing the supporting body, a first of the openings disposed remotely from the cutting edge and serving as an entrance for cooling medium, and a second of the openings disposed at an upper end of the side face beneath the cutting edge and serving as an exit for cooling medium to cool the cutting edge, the outer periphery of the supporting body defining an inner volume, the microporous structure occupying the entire inner volume.

2. The cutting insert according to claim 1 wherein the shell includes a surface layer thinner than the wear body and covering portions of the supporting body not covered by the wear body.

3. The cutting insert according to claim 1 wherein the wear body entirely covers the upper surface.

4. The cutting insert according to claim 1 wherein the body includes a lower surface, the second opening has a height less than one-half the height of the insert, the height defined in a direction substantially perpendicular to both of the upper and lower surfaces.

5. The cutting insert according to claim 1 wherein the first opening exposes a portion of an under surface of the supporting body.

6. The cutting insert according to claim 5 wherein the first opening exposes the entire under surface.

7. The cutting insert according to claim 1 wherein the insert includes a through-hole adapted to receive a clamping screw, a portion of the shell covering a wall of the through-hole except for the first opening formed in that portion of the shell.

8. The cutting insert according to claim 1 wherein the insert includes a through-hole adapted to receive a clamping screw, a portion of the shell completely covering a wall of the through-hole, the first opening being spaced from that portion of the shell.

* * * * *